United States Patent
Fang et al.

(10) Patent No.: US 11,379,248 B2
(45) Date of Patent: Jul. 5, 2022

(54) DATA PROCESSING METHOD, APPARATUS, DEVICE, AND SYSTEM

(71) Applicant: Alipay (Hangzhou) information Technology Co., Ltd., Zhejiang (CN)

(72) Inventors: Yidong Fang, Zhejiang (CN); Jiayi Yao, Zhejiang (CN); Lin Weng, Zhejiang (CN); Jing Liu, Zhejiang (CN); Jun Liu, Zhejiang (CN); Wenwei Wang, Zhejiang (CN); Junliang Zhang, Zhejiang (CN); Changchun Guo, Zhejiang (CN); Jingkai Zhao, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/357,223

(22) Filed: Jun. 24, 2021

(65) Prior Publication Data

US 2022/0012068 A1    Jan. 13, 2022

(30) Foreign Application Priority Data

Jul. 8, 2020  (CN) .......................... 202010651082.1

(51) Int. Cl.
*G06F 3/00*     (2006.01)
*G06F 9/445*    (2018.01)
(Continued)

(52) U.S. Cl.
CPC ...... *G06F 9/44526* (2013.01); *G06F 9/44505* (2013.01); *G06F 9/4881* (2013.01); *G06F 9/54* (2013.01)

(58) Field of Classification Search
CPC .............................. G06F 9/54; G06F 9/44526
(Continued)

(56) References Cited

U.S. PATENT DOCUMENTS

| 6,571,389 B1 * | 5/2003 | Spyker | G06F 9/44505 |
| | | | 717/176 |
| 2002/0124100 A1 * | 9/2002 | Adams | H04L 67/142 |
| | | | 709/232 |

(Continued)

FOREIGN PATENT DOCUMENTS

| CN | 103297381 A | 9/2013 |
| CN | 103823697 A | 5/2014 |

(Continued)

OTHER PUBLICATIONS

Aaron W. C. Kamauu, Using AppletYServlet Communication for Optimizing Window, Level and Crop for DICOM to JPEG Conversion. (Year: 2008).*

(Continued)

*Primary Examiner* — Lechi Truong
(74) *Attorney, Agent, or Firm* — Finnegan, Henderson, Farabow, Garrett & Dunner, LLP (57) ABSTRACT

A data processing method, applied to an applet, includes: sending a plug-in service request to a platform server, the plug-in service request comprising a plug-in identifier configured for the platform server to establish a usage association between a plug-in corresponding to the plug-in identifier and the applet, wherein the plug-in has an independent data server; receiving an applet access request, determining whether the applet access request and a service corresponding to the plug-in meet a preset correspondence, and if it is determined that the applet access request and the service corresponding to the plug-in meet the preset correspondence, loading the plug-in according to the usage association; and sending the applet access request to the plug-in, so that the plug-in completes a task corresponding to the applet access request by accessing the data server of the plug-in.

8 Claims, 6 Drawing Sheets

(51) Int. Cl.
*G06F 9/48* (2006.01)
*G06F 9/54* (2006.01)

(58) Field of Classification Search
USPC .......................................................... 719/310
See application file for complete search history.

(56) References Cited

U.S. PATENT DOCUMENTS

| | | | |
|---|---|---|---|
| 2004/0068746 | A1 | 4/2004 | Mori et al. |
| 2004/0098306 | A1 | 5/2004 | Fitzpatrick et al. |
| 2005/0140207 | A1 | 6/2005 | Goebels et al. |
| 2013/0007098 | A1* | 1/2013 | Averbuch ............ H04L 12/4625 709/203 |
| 2014/0082344 | A1 | 3/2014 | Case, Sr. |
| 2014/0351958 | A1 | 11/2014 | Sabulsky et al. |

FOREIGN PATENT DOCUMENTS

| | | |
|---|---|---|
| CN | 105094861 A | 11/2015 |
| CN | 108319990 A | 7/2018 |
| CN | 109995882 A | 7/2019 |
| CN | 110032358 A | 7/2019 |
| CN | 110083789 A | 8/2019 |
| CN | 110941551 A | 3/2020 |
| CN | 111159614 A | 5/2020 |
| CN | 111381903 A | 7/2020 |
| KR | 20040074854 A | 8/2004 |
| WO | WO 2018/188437 A1 | 10/2018 |

OTHER PUBLICATIONS

James "Bo" Begole, Transparent Sharing of JavaTM Applets: A Replicated Approach. (Year: 1977).*
Trudy Liu, Embedding Interactive Haptic Objects in HTML. (Year: 1997).*

* cited by examiner

DATA PROCESSING METHOD, APPARATUS, DEVICE, AND SYSTEM

CROSS-REFERENCE TO RELATED APPLICATIONS

The present application is based upon and claims priority to Chinese Patent Application No. 202010651082.1, filed on Jul. 8, 2020, the entire content of which is incorporated herein by reference.

TECHNICAL FIELD

The present specification relates to the field of computer technologies, and in particular, relates to a data processing method, apparatus, device, and system.

BACKGROUND

Some open platforms may provide a number of services. With the development of the computer technologies, different services may be provided through different applets, such as a credit service, a live broadcast service, and a utility payment service. These services generally need to call data in the platforms, but when some private data is directly provided to the services for use, the security of user data is reduced.

SUMMARY

In a first aspect of embodiments of the present specification, a data processing method applied to an applet is provided. The method includes: sending a plug-in service request to a platform server, the plug-in service request including a plug-in identifier configured for the platform server to establish a usage association between the plug-in corresponding to the plug-in identifier and the applet, wherein the plug-in has an independent data server; receiving an applet access request, determining whether the applet access request and a service corresponding to the plug-in meet a preset correspondence, and if yes, loading the plug-in according to the usage association; and sending the applet access request to the plug-in, so that the plug-in completes a task corresponding to the applet access request by accessing the data server of the plug-in.

In a second aspect of embodiments of the present specification, a data processing method applied to a plug-in with an independent data server is provided. The method includes: sending a release online request to a platform server; receiving plug-in online information of the server after the plug-in has passed a review to be online, the plug-in online information including a plug-in identifier; receiving a loading request based on a usage association from an applet, wherein the platform server establishes the usage association of the applet with the plug-in according to the plug-in identifier; and receiving an applet access request sent by the applet after loading the plug-in, and completing a task corresponding to the applet access request by accessing the data server of the plug-in.

In a third aspect of embodiments of the present specification, a data processing device applied to an applet is provided. The apparatus includes: a processor; and a memory storing instructions executable by the processor, wherein the processor is configured to: send a plug-in service request to a platform server, the plug-in service request including a plug-in identifier configured for the platform server to establish a usage association between the plug-in corresponding to the plug-in identifier and the applet, wherein the plug-in has an independent data server; receive an applet access request, determine whether the applet access request and a service corresponding to the plug-in meet a preset correspondence, and if yes, load the plug-in according to the usage association; and send the applet access request to the plug-in, so that the plug-in completes a task corresponding to the applet access request by accessing the data server of the plug-in.

In a fourth aspect of embodiments of the present specification, a data processing device applied to a plug-in with an independent data server is provided. The apparatus includes: a processor; and a memory storing instructions executable by the processor, wherein the processor is configured to: send a release online request to a platform server; receive plug-in online information of the platform server after the plug-in has passed a review to be online, the plug-in online information including a plug-in identifier; receive a loading request based on a usage association from an applet, wherein the platform server establishes the usage association of the applet with the plug-in according to the plug-in identifier; and receive an applet access request sent by the applet after loading the plug-in, and complete a task corresponding to the applet access request by accessing the data server of the plug-in.

In a fifth aspect of embodiments of the present specification, a data processing system is provided. The system includes: a platform server, an applet, and a plug-in, wherein the plug-in and the applet each have an independent data server. The platform server is configured to release the plug-in online, receive a plug-in service request sent by the applet, and establish a usage association between the applet and the plug-in based on the plug-in service request. When the applet is running, the applet acquires a permission of the applet by accessing the data server of the applet. When the applet uses a service of the plug-in, the applet loads the corresponding plug-in based on the usage association, and accesses a permission of the plug-in or data of the plug-in by accessing the data server of the loaded plug-in.

According to the data processing method, apparatus, device, and system provided in the present specification, a plug-in with an independent data server is provided. The plug-in is available to an applet. When the applet loads the plug-in, the plug-in is run when it is required to use a service of the plug-in, so that the plug-in accesses its own data server and completes the corresponding service. When the applet does not need the service of the plug-in, it is only necessary to run the applet to access a data server of the applet. The applet does not have direct access to a context of the plug-in, that is, the applet neither has access to data inside the plug-in, nor can obtain a permission of the plug-in. Conversely, the plug-in does not have direct access to a context of the applet, that is, the plug-in neither has access to data inside the applet, nor can obtain a permission of the applet. The isolation of data and permissions between the plug-in and the applet is realized, data privacy and security are ensured, and at the same time, data interaction and calling between the applet and the plug-in can be flexibly realized.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The described embodiments are merely some of rather than all the embodiments of the present application.

With the development of computer technologies, the development and use of applets greatly facilitate people's work and life. An applet, as a new Internet application technology framework, is an application that can be used without downloading and installing, and may be hosted in a mobile application or a hardware device without the need of independent development. An applet may also be referred to as a small application. Users can directly use an applet in the mobile application or the hardware device. Moreover, different applets may provide different services, and each applet can meet a relatively simple basic application. Generally, after an applet is developed by an applet developer, it may be embedded in a mobile application or some network platforms for use. The applet may be understood as a service provided by the mobile application or network platform. When the applet is running, it generally relies on data provided by its host, such as the mobile application or network platform. However, some data may be relatively private and cannot be directly provided to the applet for use. For example, a certain network platform provides a merchant applet. When a user uses the merchant applet, it may be necessary to determine, based on a credit score of the user, whether the user needs a deposit or whether the user is eligible for registration. The user may query his/her own credit score in the merchant applet. However, the credit score belongs to relatively private information of the user, so the network platform cannot directly provide it to the merchant applet, but it needs to be displayed to the user.

Figure 1:
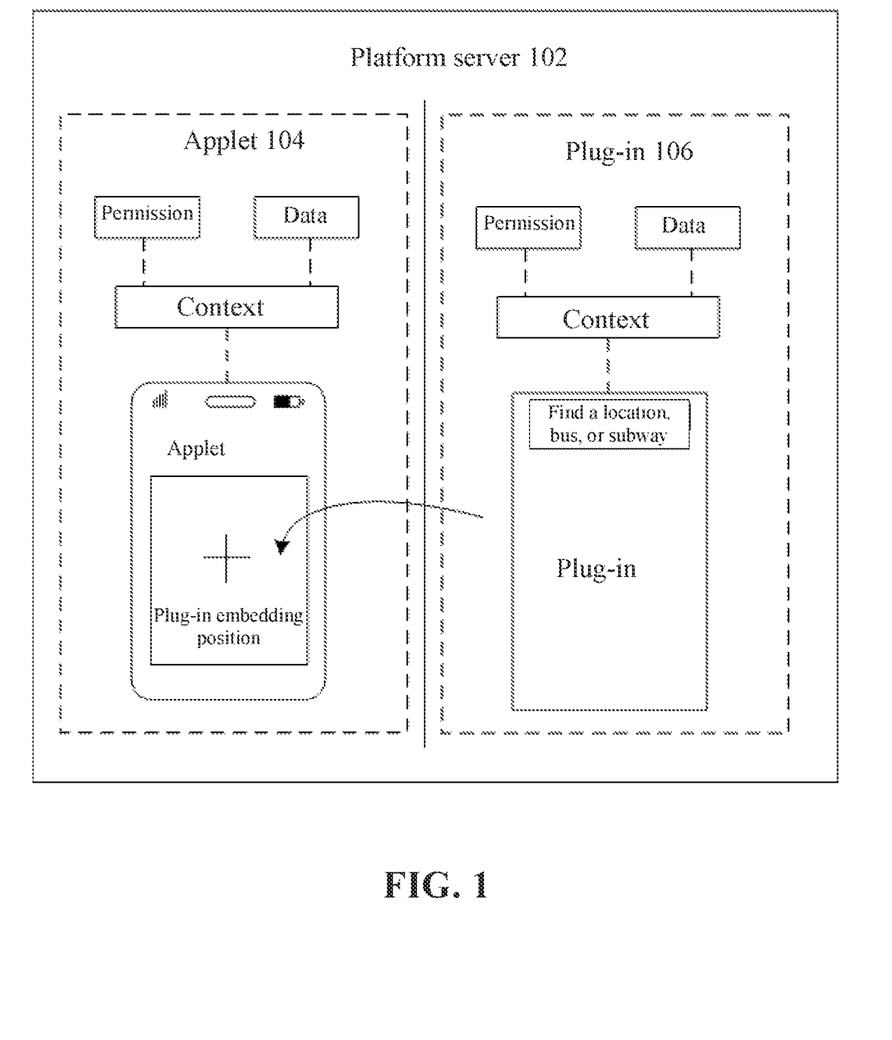
FIG. 1 is a schematic diagram of a data processing system with isolated contexts and permissions according to an embodiment.

Embodiments of the present specification provides a framework system with isolated contexts and permissions. FIG. 1 is a schematic diagram of a data processing system with isolated contexts and permissions according to an embodiment. As shown in FIG. 1, the data processing system may include a platform server 102, one or more applets 104, and one or more plug-ins 106. For illustrative purpose only, an applet 104 and a plug-in 106 loaded by the applet 104 are shown in FIG. 1.

In an embodiment, the system may include a plurality of applets and a plurality of plug-ins. Different applets may load different plug-ins, and one applet may load one or more plug-ins, which is not specifically limited in the embodiment. The plug-ins and the applets may each have an independent data server. For example, as shown in FIG. 1, permissions and data of the applet 104 and the plug-in 106 are isolated from each other, and each of the applet 104 and the plug-in 106 has its own independent data server. The plug-in 106 may be an independent functional module, which may be integrated and used by the applet 104. The plug-in 106 in the embodiment is different from a general plug-in, and may be developed and created using an applet development tool. A plug-in developer may be a company or an individual independent of an applet developer, and during running of the plug-in, contexts and permissions are independent of the applet. The platform server 102 may be a platform for an applet or plug-in developer to settle and register. In the platform server 102, the developer may create an applet (e.g., the applet 104) or a plug-in (e.g., the plug-in 106), and the platform server 102 may apply for a relevant permission for the applet or plug-in.

In an embodiment, the plug-in developer may use an applet development tool to develop and build the plug-in, and then upload the developed plug-in to the platform server 102, which operates as an open platform. The platform server 102 may review the uploaded plug-in. After the plug-in passes the review, it may be released online independently of the applet. The plug-in developer may require the open platform to assign a corresponding identifier and permission to the plug-in. The plug-in may provide a custom component for the applet to be embedded therein, may provide a page for the applet to redirect to, and may also provide an application programming interface (API) module for the applet to reference and call.

In an embodiment, the platform server 102 may also provide a plug-in application market. An applet may search the plug-in application market of the platform server for a plug-in suitable for it, and send a plug-in service request to the platform server 102 to request loading the corresponding plug-in. The platform server 102, after receiving the plug-in service request from the applet, may establish a usage association between the applet and the plug-in. After the usage association is established, when an applet container runs the applet, the plug-in is loaded where it needs to be run, and an independent context is generated for the plug-in during running. That is, when the applet is running, a permission of the applet may be obtained by accessing data of the applet through a context of the applet. When the applet loads and runs the plug-in, code in the plug-in runs in a context of the plug-in, and data of the plug-in or the permission of the plug-in is accessible. The applet does not have direct access to the context of the plug-in, that is, the applet neither has access to the data inside the plug-in, nor can obtain the permission of the plug-in. Conversely, the plug-in does not have direct access to a context of the applet, that is, the plug-in neither has access to data inside the applet, nor can obtain a permission of the applet.

The data servers of the plug-in and the applet may be independent of each other. For example, the data servers of the plug-in and the applet are completely different, or when the plug-in and the applet have the same data server, permissions of the plug-in and the applet in the data server are different. For example, the data servers of the plug-in and the applet are both a platform server, but the platform server may assign different permissions to the plug-in and the applet, that is, the plug-in and the applet may have access to or use different data in the platform server.

In the embodiments of the present specification, the isolation of data from permissions is realized through a plug-in capable of supporting context isolation, to overcome the problem caused by being unable to isolate a context of a common custom component from an applet. A plug-in system may also include open platform data, permissions, and a research and development support system, so that the plug-in can establish a separate application identifier, and use a standardized process for independent release. In this way, the plug-in does not need to be bundled with an applet framework, and the security issue is solved. At the same time, this also applies to all third-party developers in addition to an applet framework organization, thereby expanding a scope of application for plug-in developers.

The present specification provides operation steps in a method or components of an apparatus in the following embodiments or the accompanying drawings. However, the method or the apparatus may include more operation steps or module units, or fewer operations steps or module units after local combination. For steps or components that do not logically have a necessary causal relationship, the order of execution of these steps, or the modular structure of the apparatus is not limited to the execution order or modular structure illustrated in the embodiments of the present specification or the accompanying drawings. The method or the modular structure may be sequentially executed or executed in parallel based on the method or the modular structure illustrated in the embodiments or the accompanying drawings (for example, a parallel processor or multi-thread processing environment, or even an implementation environment including distributed processing and server cluster).

Figure 2:
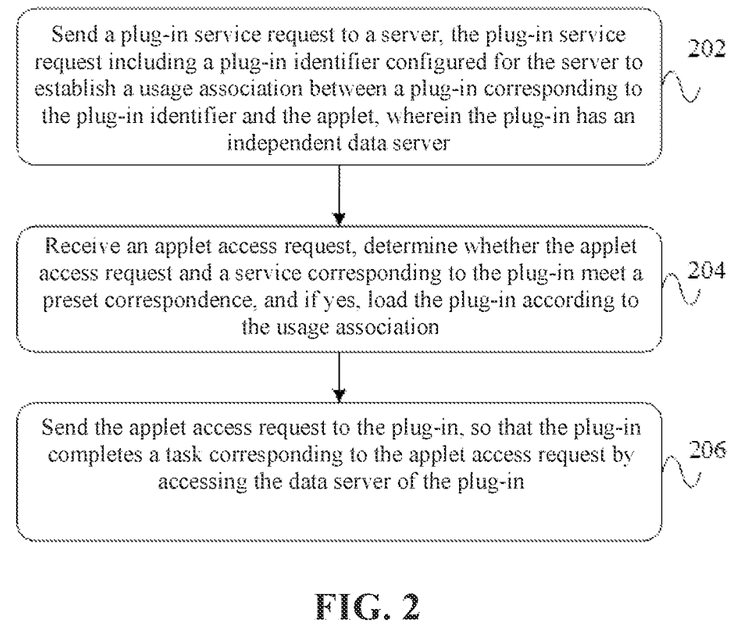
FIG. 2 is a flowchart of a data processing method according to an embodiment.

FIG. 2 is a flowchart of a data processing method according to an embodiment. The method may be applied to an applet. The applet may be an applet in a terminal such as a computer, a tablet computer, a server, a smart phone, a smart wearable device, and a vehicle-mounted device. The method may include the following steps.

In step 202, a plug-in service request is sent to a server, the plug-in service request including a plug-in identifier configured for the server to establish a usage association between a plug-in corresponding to the plug-in identifier and the applet, wherein the plug-in has an independent data server.

In an embodiment, the applet may request, in the server such as the platform server 102 in FIG. 1, the use of one or more plug-ins in the platform server. For example, the applet may send a plug-in service request to the server, and the plug-in service request may include a plug-in identifier, so that the server can establish a usage association between the plug-in and the applet according to the plug-in identifier in the received plug-in service request. The plug-in identifier may be a character or character string that can uniquely identify the plug-in assigned by the server to the plug-in when the plug-in is released online in the server. The specific form is not specifically limited in the embodiment. In addition, the plug-in in the embodiment has an independent data server, that is, contexts and permissions of the plug-in and the applet are isolated from each other, and the plug-in has data, permissions, and a research and development support system.

One applet may be associated with one or more plug-ins, which may be specifically determined according to an actual application scenario and a usage requirement, and is not specifically limited in the embodiment of the present specification.

In step 204, an applet access request is received, it is determined whether the applet access request and a service corresponding to the plug-in meet a preset correspondence, and if yes, the plug-in is loaded according to the usage association.

In an embodiment, when a user uses the applet, the applet may receive an applet access request sent by the user, and an applet container may run the applet according to the received applet access request. For example, in a client or device system, in order to run an applet or plug-in, an applet operating environment needs to be provided to act as a bridge between the applet and an underlying platform, and this operating environment is referred to as an applet container. When the applet is running, it may be first determined whether the applet access request and the server corresponding to the plug-in meet a preset correspondence, that is, whether the currently received applet access request needs to use a service corresponding to the plug-in, that is, a function of the plug-in. When the applet access request is received, it may be determined whether the request needs to use the service corresponding to the plug-in, that is, whether the applet access request and the service corresponding to the plug-in meet the preset correspondence. If it is determined that the service corresponding to the plug-in needs to be used, the corresponding plug-in may be loaded according to the usage association established by the server.

For example, applet A is a car rental applet developed by merchant B. Applet A requests associated plug-in a in the server, and plug-in a may be configured to acquire a credit score of the user. When the user registers applet A, merchant B needs to determine, according to a credit score of the user, whether the user needs to submit a deposit in advance. The credit score is generally assessed and determined by a professional network platform based on a consumption record of the user and the like, and belongs to private data of the network platform and the user. The network platform does not want to directly provide the credit score of the user to merchant B for use. In this case, when the user needs to acquire the credit score of the user from applet A, it is determined that a service of plug-in a needs to be used, and applet A may load its associated plug-in a. By running plug-in a, plug-in a acquires the credit score of the user from the network platform that evaluates the credit score, and displays it to the user, but merchant B cannot know it. That is, merchant B cannot acquire the credit score of the user directly from the network platform, but can provide the credit score of the user to the user for viewing by loading plug-in a, and plug-in a may directly return a result, which indicates whether the credit score meets a requirement or not, to applet A.

In step 206, the applet access request is sent to the plug-in, so that the plug-in completes a task corresponding to the applet access request by accessing the data server of the plug-in.

In an embodiment, after the applet loads the plug-in, it may send the applet access request to the plug-in to run code inside the plug-in. When the plug-in is running, the data server of the plug-in is accessed, and data or a permission of the plug-in is accessed, to execute the applet access request and complete the corresponding task. For example, in the above embodiment, applet A may load and run plug-in a, so that plug-in a can acquire the credit score of the user by accessing a credit evaluation network platform.

In some embodiments of the present specification, when it is determined that the applet access request and the service corresponding to the plug-in do not meet the preset correspondence, the applet is run, and the task corresponding to the applet access request is completed by accessing a data server of the applet.

In an embodiment, when the applet access request received by the applet does not need to use the service of the plug-in, the applet may be directly run, and a service corresponding to the applet access request is completed by accessing the data server of the applet. The data server of the applet and the data server of the plug-in may be different data servers or the same data server. When the plug-in and the applet use the same data server, permissions of the plug-in and the applet on the data server are different, that is, data that they can use or access may be different, so as to realize data isolation between the plug-in and the applet.

In the data processing method provided in the present specification, a plug-in with an independent data server is provided. The plug-in is available to an applet. When the applet loads the plug-in, the plug-in is run when it is required to use a service of the plug-in, so that the plug-in can access its own data server and complete the corresponding service. When the applet does not need the service of the plug-in, it is only necessary to run the applet to access a data server of the applet. The applet does not have direct access to a context of the plug-in, that is, the applet neither has access to data inside the plug-in, nor can obtain a permission of the plug-in. Conversely, the plug-in does not have direct access to a context of the applet, that is, the plug-in neither has access to data inside the applet, nor can obtain a permission of the applet. The isolation of data and permissions between the plug-in and the applet is realized, data privacy and security are ensured, and at the same time, data interaction and calling between the applet and the plug-in can be flexibly realized.

In some embodiments, the plug-in includes at least one of a component, a page, or a calling interface, and loading the plug-in includes at least one of: embedding the component in the plug-in into the applet, the component being provided with a component attribute configured to cause the applet to send the applet access request to the plug-in; adding a link to the page in the plug-in to the applet; or calling the calling interface in the plug-in.

For example, the plug-in may include at least one of a component, a page, or a calling interface. The component may be a functional module, such as a display and interaction module with a user interface, which may be integrated and used by the applet, and after being integrated by the applet, the custom component runs in the context of the applet. A context is data and status information that an application or a functional module depends on during running. For example, data acquired or generated by an applet or a plug-in in a running process may be referred to as a context. Conventionally, the component is a module directly embedded into an applet, but the context of the component embedded into the applet generally cannot be isolated from the applet. The component in the present application is in the plug-in. The component has the same data server as the plug-in. A component attribute of the component in the plug-in may be defined. The component attribute may be configured for the applet to send an applet access request to the plug-in when the component is embedded. Unidirectional data transmission from the applet to the plug-in can be realized by defining the component attribute of the component. The plug-in may include a plurality of components with different functions, which may be specifically defined and configured by the user, and the components support context isolation. When the component in the plug-in is embedded into the applet, the component runs in the context of the plug-in, which realizes the isolation of data and permissions and overcomes the problem caused by impossible isolation of contexts of ordinary custom components from the applet.

Also for example, the plug-in may also be configured with a plurality of open calling interfaces, and the applet may realize data interaction with the plug-in by calling the calling interfaces of the plug-in. In addition, the plug-in may also include a page that can be redirected to. A plug-in developer may choose to expose these plug-in pages for the applet to be redirected to, so that the applet can be redirected to the plug-in page while achieving context isolation, that is, data and permissions are isolated from the applet. The user may choose an appropriate loading method to load the plug-in according to an actual application scenario. For example, in some scenarios, the plug-in may generally need to be embedded into the applet to achieve a better effect. In this way, a method of embedding a component may be selected to load the plug-in. In some service scenarios, the method of calling interfaces or page redirection may be preferred, which may be specifically selected according to an actual requirement. The embodiments of the present specification provide a variety of methods for loading the plug-in, and each method can realize the data isolation of the plug-in and the applet.

In some embodiments, the plug-in includes a configuration declaration file including at least one of a component, a page, or a calling interface that are open to the applet, and the loading the plug-in according to the usage association includes: acquiring the configuration declaration file of the plug-in according to the usage association; and loading the plug-in according to the configuration declaration file through the component, page, or calling interface open to the applet by the plug-in.

For example, the plug-in may include a configuration declaration file. The configuration declaration file may include a component, a page, and a calling interface that are open to the applet, and may also include information such as functions of components and pages. The configuration declaration file may also include components, pages, and calling interfaces that are not open to the applet. When the applet needs to load the plug-in, it may acquire the configuration declaration file of the plug-in associated therewith according to the usage association established by the server. The plug-in is loaded by selecting an appropriate method according to the component, the page, and the calling interface that are open to the applet and declared in the configuration declaration file. For example, the method of embedding the component in the plug-in open to the applet, or adding a link to or a button of a page of the plug-in to the applet, or directly calling the calling interface in the plug-in open to the applet, or the like is selected. With the configuration declaration file, the applet can accurately and quickly select an appropriate method to load the plug-in, thereby improving the efficiency of data processing.

In some embodiments, if the plug-in is loaded by calling the calling interface in the plug-in, the method further includes: sending a callback function to the plug-in through the calling interface, so that the plug-in accesses a data server of the applet when calling the callback function.

For example, if the applet loads the plug-in through the calling interface, the applet may transmit a callback function to the plug-in through the calling interface. The callback function may be a function called through a function pointer. If the function pointer (address) is transmitted to another function as a parameter, this is a callback function when the pointer is used to call a function to which it points. When the applet transmits a callback function to the plug-in, the callback function may be called inside the plug-in. When the callback function is called inside the plug-in, the data server of the applet is accessed. In other words, during running of the applet, when the applet calls a plug-in interface, the context switches to the context of the plug-in when entering the plug-in interface. If the applet transmits the callback function to the plug-in, when the callback function is called inside the plug-in, the context switches back to the context of the applet when entering the callback function. The plug-in may have indirect access to the data of the applet and control the behavior of the applet within an allowed orientation of the applet. This mechanism ensures the security isolation of the contexts on both sides, and can flexibly realize data exchange and mutual call between the applet and the plug-in.

In some embodiments, if the plug-in is loaded by calling the calling interface in the plug-in, the method further includes: receiving an execution result of executing the applet access request returned by the plug-in through the calling interface.

For example, the plug-in itself may provide a calling interface for the applet to load the plug-in, so that the applet and the plug-in can communicate bidirectionally according to a component attribute and interface as agreed. That is, the plug-in may return an execution result of executing the applet access request to the applet through the calling interface, for example, the credit score meets a condition.

Figure 3:
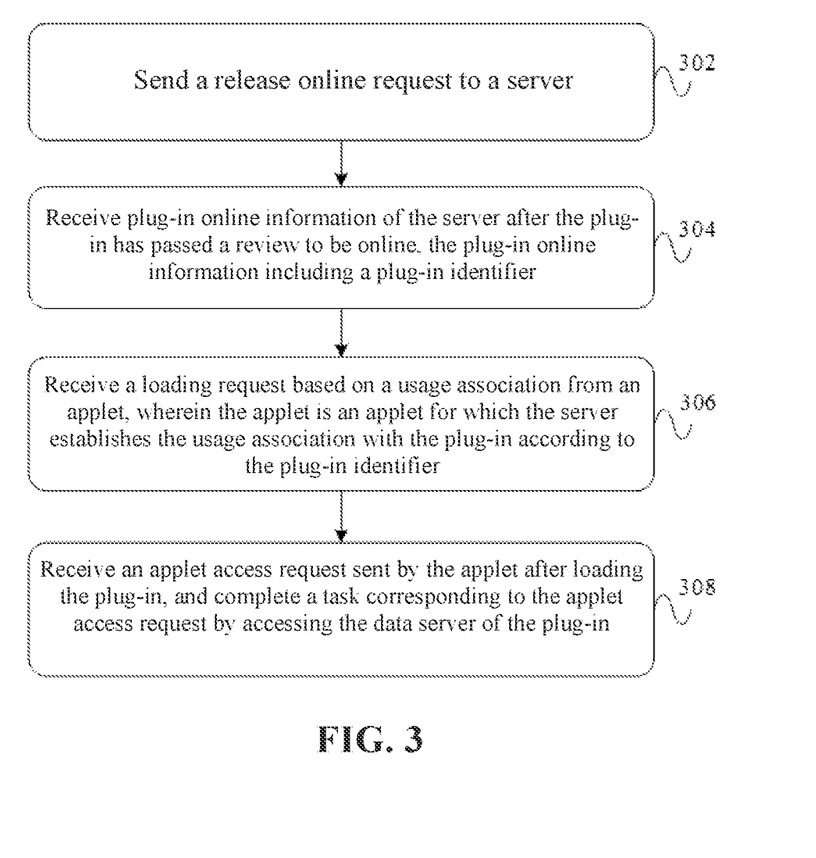
FIG. 3 is a flowchart of a data processing method according to an embodiment.

FIG. 3 is a flowchart of a data processing method according to an embodiment. The data processing method may be applied to a plug-in. The plug-in has an independent data server. The method may include the following steps:

In step 302, a release online request is sent to a server.

In an embodiment, the plug-in may be an independent functional module, which may be integrated and used by an applet. Context and permission of the plug-in are independent of the applet during running. A plug-in developer may be a company or an individual independent of an applet developer. The plug-in developer may use an applet development tool to develop and build a plug-in. Upon completion of the development and building of the plug-in, the plug-in developer may send a release online request to a server, such as the platform server 102 in FIG. 1 to request releasing the plug-in in the server online. The plug-in may include a plug-in code folder. The plug-in in the embodiment may also include a component, a page, and a calling interface. The component, the page, and the calling interface that are open to the applet may be declared in the configuration declaration file for the applet to use when loading the plug-in. The plug-in in the embodiment may be developed and created by different plug-in developers. There may be no relation between a creator of the plug-in and a creator of the applet that loads the plug-in. After created plug-ins are released in the server, they all can be used by the applet.

In step 304, plug-in online information of the server after the plug-in has passed a review to be online is received, the plug-in online information including a plug-in identifier.

In an embodiment, after the server receives a release online request of the plug-in developer, the server may review the released plug-in, for example, whether the plug-in is legal, whether the plug-in can be used by other applets, and so on. After the plug-in passes the review, the server may upload the plug-in to the server, and at the same time, the server may return plug-in online information to the plug-in. The plug-in online information may include a plug-in identifier. The plug-in identifier may be a character string that can uniquely identify the plug-in and is assigned by the server to the plug-in, and the server may also assign a corresponding permission to the plug-in, such as defining data on the server accessible by the plug-in.

In step 306, a loading request based on a usage association from an applet is received, wherein the applet is an applet for which the server establishes the usage association with the plug-in according to the plug-in identifier.

In an embodiment, after the plug-in is released online in the server, the applet may establish a usage association with the plug-in through the server. When the applet needs to use a service corresponding to the plug-in, the applet may select to load the plug-in, and the plug-in may receive a loading request sent by the applet.

In some embodiments, the plug-in includes at least one of a component, a page, or a calling interface, and receiving a loading request based on a usage association from an applet includes at least one of: receiving a request for embedding the component in the plug-in sent from the applet; the component being provided with a component attribute configured to cause the applet to send the applet access request to the plug-in; receiving a request for adding a link to the page in the plug-in to the applet; or receiving a request for calling the calling interface in the plug-in sent by the applet.

For example, the applet may load the plug-in by embedding the component in the plug-in, or load the plug-in by calling the calling interface in the plug-in, or load the plug-in by adding a link of the page in the plug-in, which may be specifically determined according to an actual use situation and is not specifically limited by the embodiment of the present specification. When the plug-in is loaded in the form of embedding the component, unidirectional communication between the applet and the plug-in may be realized according to a component attribute of the component in the plug-in. That is, data may be transmitted by customizing a component attribute: the component in the plug-in may define a component attribute, and required data may be unidirectionally transmitted from the applet to the plug-in when the applet embeds the custom component. The component may support context isolation. When the custom component in the plug-in is embedded into the applet, the custom component is run in the context of the plug-in, which realizes the isolation of data and permissions and overcomes the problem caused by impossible isolation of a context of a common custom component from the applet. When the plug-in is loaded through the calling interface, the plug-in is exposed to the calling interface of the applet. The applet may call these calling interfaces and transmit the data required by the plug-in. Moreover, bidirectional communication between the plug-in and the applet may be realized. In some embodiments of the present specification, the plug-in may return, to the applet, an execution result of the applet access request through the calling interface called by the applet. By loading the plug-in through the page, while the applet may be redirected to the page of the plug-in, context isolation is realized, that is, data and permissions are isolated from a host applet. The user may choose an appropriate loading method to load the plug-in according to an actual application scenario. For example, in some scenarios, the plug-in may generally need to be embedded into the applet to achieve a better effect. In this way, a method of embedding a component may be selected to load the plug-in. In some service scenarios, the method of calling interfaces or page redirection may be preferred, which may be specifically selected according to an actual requirement. The embodiments of the present specification provide a variety of methods for loading the plug-in, and each method can realize the data isolation of the plug-in and the applet.

In step 308, an applet access request sent by the applet after loading the plug-in is received, and a task corresponding to the applet access request is completed by accessing the data server of the plug-in.

In an embodiment, after the applet loads the plug-in, it may send an applet access request to the plug-in, the plug-in may run its own code, and a service corresponding to the applet access request is completed by accessing the data server of the plug-in, such as inquiring a credit score of the user and issuing an invoice, which is not specifically limited by the embodiment of the present specification. After the plug-in is released online, the applet developer may order the plug-in on an open platform and request establishing a usage relationship between the applet and the plug-in. During development of the applet, it may refer to the plug-in through the plug-in identifier. After the applet is built, uploaded, and released through an applet development tool, when an applet container runs the applet, the plug-in is loaded where it needs to be run, and an independent context is generated for the plug-in during running. When the applet is running, a permission of the applet may be obtained by accessing data of the applet through a context of the applet. When the applet loads and runs the plug-in, code in the plug-in runs in a context of the plug-in, and data of the plug-in or the permission of the plug-in is accessible. The applet does not have direct access to the context of the plug-in, that is, the applet neither has access to the data inside the plug-in, nor can obtain the permission of the plug-in. Conversely, the plug-in does not have direct access to the context of the host applet, that is, the plug-in neither has access to data inside the applet, nor can obtain a permission of the applet.

In the data processing method provided by the embodiment of the present specification, the context in which the plug-in runs is isolated from the applet loaded with the plug-in, so that data and permissions of the plug-in are isolated from data and permissions of the applet. At the same time, the plug-in provides a mechanism to support a custom component that can be embedded, a plug-in page that can be redirected to, and a callable interface for the applet to embed, redirect to, and call, and in the calling process, the context switches automatically depending on whether the call actually takes place within the plug-in or the applet, which not only ensures data security, but also ensures the scalability of various application scenarios. The above capabilities enable the plug-in itself to become a self-closed loop business and commercial service capability that combines front-end and back-end services, rather than just a combination of some interface elements.

In some embodiments, the plug-in includes the calling interface, and the method further includes: receiving a callback function sent by the applet through the calling interface, and accessing a data server of the applet when the callback function is called.

For example, if the applet loads the plug-in through the calling interface, the applet may transmit a callback function to the plug-in through the calling interface. The callback function may be understood as a function called through a function pointer. If the function pointer (address) is transmitted to another function as a parameter, this is a callback function when the pointer is used to call a function to which it points. When the applet transmits a callback function to the plug-in, the callback function may be called inside the plug-in. When the callback function is called inside the plug-in, the data server of the applet is accessed. In other words, during running of the applet, when the applet calls a plug-in interface, the context switches to the context of the plug-in when entering the plug-in interface. If the applet transmits the callback function to the plug-in, when the callback function is called inside the plug-in, the context switches back to the context of the applet when entering the callback function. The plug-in may have indirect access to the data of the applet and control the behavior of the applet within an allowed orientation of the applet. This mechanism ensures the security isolation of the contexts on both sides, and can flexibly realize data exchange and mutual call between the applet and the plug-in.

Based on the data processing methods described above, corresponding apparatuses for data processing are further provided in embodiments of the present specification. Each module in the apparatuses may be implemented using software, or hardware, or a combination of software and hardware.

Figure 4:
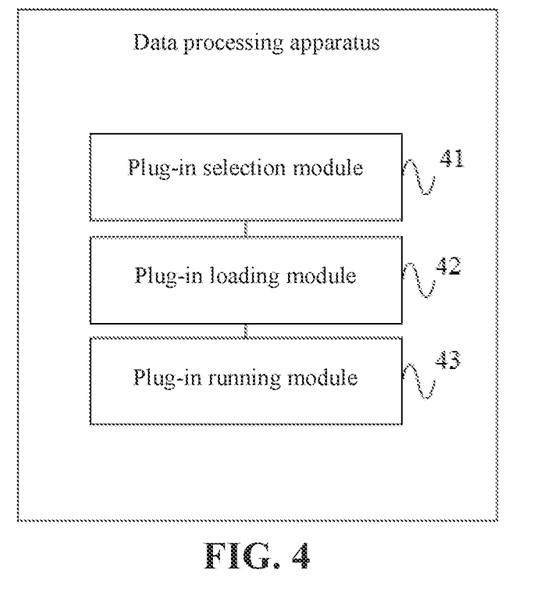
FIG. 4 is a schematic diagram of a data processing apparatus according to an embodiment.

FIG. 4 is a schematic diagram of a data processing apparatus according to an embodiment. The apparatus may be applied to the applet in the above embodiment. As shown in FIG. 4, the data processing apparatus may include: a plug-in selection module 41 configured to send a plug-in service request to a server, the plug-in service request including a plug-in identifier, so that the server establishes a usage association between the plug-in corresponding to the plug-in identifier and the applet, wherein the plug-in has an independent data server; a plug-in loading module 42 configured to receive an applet access request, determine whether the applet access request and a service corresponding to the plug-in meet a preset correspondence, and if yes, load the plug-in according to the usage association; and a plug-in running module 43 configured to send the applet access request to the plug-in, so that the plug-in completes a task corresponding to the applet access request by accessing the data server of the plug-in.

According to the data processing apparatus, the isolation of data from permissions is realized through a plug-in capable of supporting context isolation, and the problem caused by impossible isolation of a context of a common custom component from an applet is overcome. A plug-in system may also include open platform data, permissions, and a research and development support system, so that the plug-in can establish a separate application identifier, and use a standardized process for independent release. In this way, the plug-in does not need to be bundled with an applet framework, and the security issue is solved. At the same time, this also applies to all third-party teams in addition to an applet framework organization, thereby expanding a scope of application for plug-in developers.

In some embodiments, the apparatus further includes an applet running module (not shown) configured to: when the applet access request and the service corresponding to the plug-in do not meet the preset correspondence, run the applet, and complete the task corresponding to the applet access request by accessing a data server of the applet.

According to the data processing apparatus, when the applet is running, a permission of the applet may be obtained by accessing data of the applet through a context of the applet. When the applet loads and runs the plug-in, code in the plug-in runs in a context of the plug-in, and data of the plug-in or the permission of the plug-in is accessible. The applet does not have direct access to the context of the plug-in, that is, the applet neither has access to the data inside the plug-in, nor can obtain the permission of the plug-in. Conversely, the plug-in does not have direct access to the context of the applet, that is, the plug-in neither has access to data inside the applet, nor can obtain a permission of the applet, thereby implementing the data isolation.

In some embodiments, the plug-in includes at least one of a component, a page, or a calling interface, and the plug-in loading module 42 is further configured to load the plug-in by using at least one of: embedding the component in the plug-in into the applet, the component being provided with a component attribute configured to cause the applet to send the applet access request to the plug-in; adding a link to the page in the plug-in to the applet; or calling the calling interface in the plug-in.

According to the data processing apparatus, the user may choose an appropriate loading method to load the plug-in according to an actual application scenario. For example, in some scenarios, the plug-in may generally need to be embedded into the applet to achieve a better effect. In this way, a method of embedding a component may be selected to load the plug-in. In some service scenarios, the method of calling interfaces or page redirection may be preferred, which may be specifically selected according to an actual requirement. The embodiments of the present specification provide a variety of methods for loading the plug-in, and each method can realize the data isolation of the plug-in and the applet.

In some embodiments, if the plug-in loading module 42 loads the plug-in by calling the calling interface in the plug-in, the plug-in running module 43 is further configured to: send a callback function to the plug-in through the calling interface, so that the plug-in accesses a data server of the applet when calling the callback function.

Figure 5:
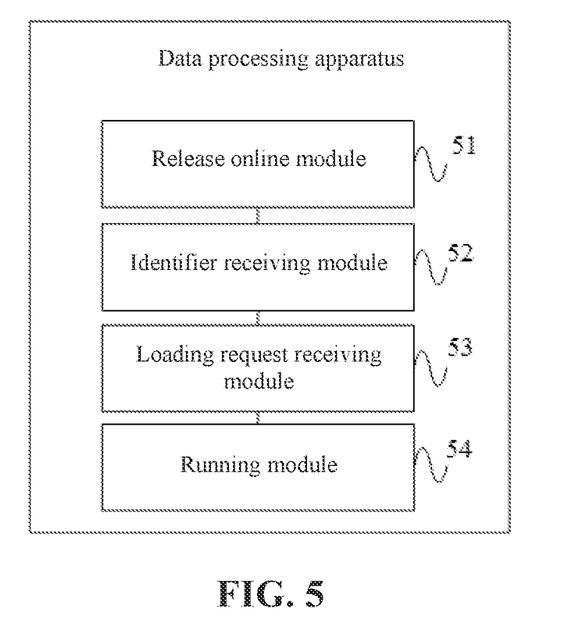
FIG. 5 is a schematic diagram of a data processing apparatus according to an embodiment.

FIG. 5 is a schematic diagram of a data processing apparatus according to an embodiment. The apparatus may be applied to a plug-in with an independent data server. The apparatus includes: a release online module 51 configured to send a release online request to a server; an identifier receiving module 52 configured to receive plug-in online information of the server after the plug-in has passed a review to be online, the plug-in online information including a plug-in identifier; a loading request receiving module 53 configured to receive a loading request based on a usage association from an applet, wherein the applet is an applet for which the server establishes the usage association with the plug-in according to the plug-in identifier; and a running module 54 configured to receive an applet access request sent by the applet after loading the plug-in, and complete a task corresponding to the applet access request by accessing the data server of the plug-in.

According to the data processing apparatus, a plug-in with an independent data server is provided. The plug-in is available to an applet. When the applet loads the plug-in, the plug-in is run when it is required to use a service of the plug-in, so that the plug-in can access its own data server and complete the corresponding service. When the applet does not need the service of the plug-in, it is only necessary to run the applet to access a data server of the applet. The applet does not have direct access to a context of the plug-in, that is, the applet neither has access to data inside the plug-in, nor can obtain a permission of the plug-in. Conversely, the plug-in does not have direct access to a context of the applet, that is, the plug-in neither has access to data inside the applet, nor can obtain a permission of the applet. The isolation of data and permissions between the plug-in and the applet is realized, data privacy and security are ensured, and at the same time, data interaction and calling between the applet and the plug-in can be flexibly realized.

It should be noted that the above apparatuses may include other implementations. Specific implementations may be obtained with reference to the description of the corresponding method embodiments.

Embodiments of the present specification also provide a data processing device, including: a processor; and a memory configured to store executable instructions by the processor. The processor is configured to execute the instructions to perform the above data processing methods. For example, the processor is configured to: send a plug-in service request to a server, the plug-in service request including a plug-in identifier, so that the server establishes a usage association between the plug-in corresponding to the plug-in identifier and the applet, wherein the plug-in has an independent data server; receive an applet access request, determine whether the applet access request and a service corresponding to the plug-in meet a preset correspondence, and if yes, load the plug-in according to the usage association; and send the applet access request to the plug-in, so that the plug-in completes a task corresponding to the applet access request by accessing the data server of the plug-in. Also for example, the processor is configured to: send a release online request to a server; receive plug-in online information of the server after the plug-in has passed a review to be online, the plug-in online information including a plug-in identifier; receive a loading request based on a usage association from an applet, wherein the applet is an applet for which the server establishes the usage association with the plug-in according to the plug-in identifier; and receive an applet access request sent by the applet after loading the plug-in, and complete a task corresponding to the applet access request by accessing the data server of the plug-in.

It should be noted that the above device may include other implementations. Specific implementations may be obtained with reference to the description of the corresponding method embodiments.

The data processing device may be used in a variety of data analysis and processing systems. The data processing device may be implemented as a separate server, or may include a server cluster, a system (including a distributed system), software (an application), an actual operating apparatus, a logic gate circuit apparatus, a quantum computer, and the like using one or more of the methods described above.

Figure 6:
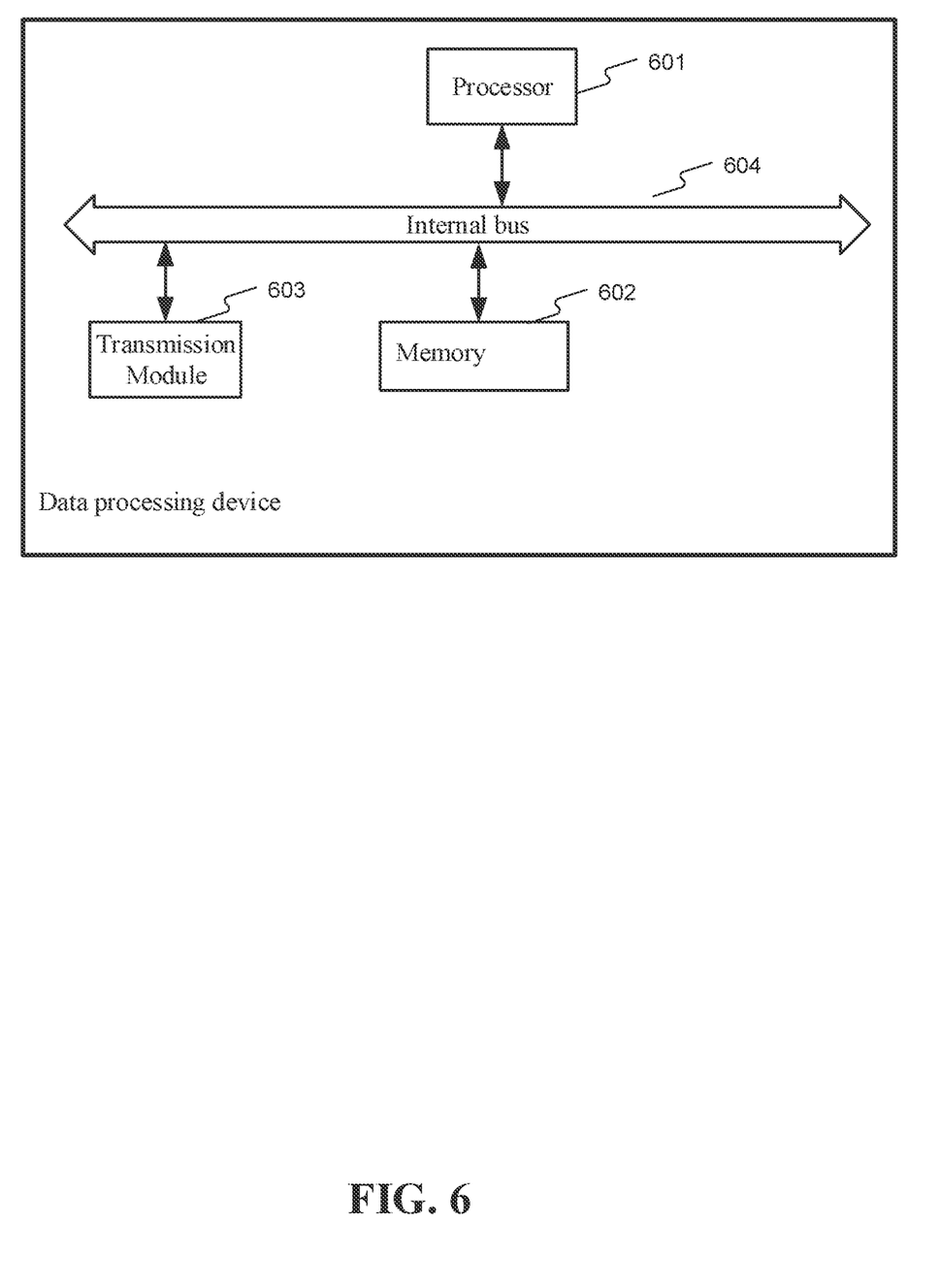
FIG. 6 is a block diagram of a data processing device according to an embodiment.

FIG. 6 is a block diagram of a data processing device according to an embodiment. The data processing device may be a mobile terminal, a computer terminal, a server, etc. As shown in FIG. 6, the data processing device may include a processors 601, which may include, but is not limited to, a processing apparatus such as a microprocessor (MCU) or a programmable logic device (FPGA)), a memory 602 configured to store data and instructions, and a transmission module 603 configured for communication functions. The processor 601, the memory 602, and the transmission module 603 may be connected to an internal bus 604. Those of ordinary skill in the art may understand that the structure shown in FIG. 6 is merely illustrative and does not limit the structure of the data processing device. For example, the data processing device may also include more or fewer components than those shown in FIG. 6, or include other processing hardware, such as a database, a multi-level cache, or a GPU, or may have a configuration different from that shown in FIG. 6.

The memory 602 may include volatile and non-volatile memories, and may be configured to store software programs and modules of application software, such as program instructions/modules corresponding to the above data processing methods, and the processor 601 performs various functional applications and resource data updating by running the software programs and modules stored in the non-volatile memory. The non-volatile memory may include a high-speed random access memory, and may also include one or more magnetic storage apparatuses, a flash memory, or another non-volatile solid-state memory. In some embodiments, the non-volatile memory may further include memories remotely arranged with respect to the processor 601, and these remote memories may be connected to a computer terminal through a network. Examples of the above network include, but are not limited to, the Internet, an intranet, a local area network, a mobile communication network, and a combination thereof.

The transmission module 603 is configured to receive or send data via a network. Examples of the network may include a wireless network provided by a communication provider of a computer terminal. In one example, the transmission module 603 includes a network interface controller (NIC), which may be connected to other network devices through a base station so as to communicate with the Internet. In one example, the transmission module 603 may be a radio frequency (RF) module, which is configured to communicate with the Internet in a wireless manner.

Embodiments of the present specification also provide a non-transitory computer-readable storage medium having stored thereon instructions that, when executed by a processor of a device, cause the device to perform any of the above data processing methods. For example, the method includes: sending a plug-in service request to a server, the plug-in service request including a plug-in identifier, so that the server establishes a usage association between the plug-in corresponding to the plug-in identifier and the applet, wherein the plug-in has an independent data server; receiving an applet access request, determining whether the applet access request and a service corresponding to the plug-in meet a preset correspondence, and if yes, loading the plug-in according to the usage association; and sending the applet access request to the plug-in, so that the plug-in completes a task corresponding to the applet access request by accessing the data server of the plug-in. Also for example, the method includes: sending a release online request to a server; receiving plug-in online information of the server after the plug-in has passed a review to be online, the plug-in online information including a plug-in identifier; receiving a loading request based on a usage association from an applet, wherein the applet is an applet for which the server establishes the usage association with the plug-in according to the plug-in identifier; and receiving an applet access request sent by the applet after loading the plug-in, and completing a task corresponding to the applet access request by accessing the data server of the plug-in.

The storage medium may include a physical apparatus configured to store information, which generally digitizes the information and then stores the same in a medium in an electrical, magnetic, or optical manner. The storage medium may include: an apparatus that stores information by means of electrical energy, such as various types of memories, for example, a RAM and a ROM; an apparatus that stores information by means of magnetic energy, such as a hard disk, a floppy disk, a magnetic tape, a magnetic core memory, a bubble memory, and a USB disk; and an apparatus that stores information by optical means, such as a CD or a DVD. There are also other forms of readable storage media, such as a quantum memory, a graphene memory, and so on.

In some embodiments, the above data processing methods or apparatuses may be implemented by a processor executing corresponding program instructions in a computer, such as being implemented at a PC terminal by using the c++ language of the windows operating system, being implemented in a linux system, or in other manners, for example, being implemented at a smart terminal by using the programming languages of the android and iOS systems, being implemented based on the processing logic of a quantum computer, and so on.

With the development of technologies, the improvement to many method flows can be implemented as a direct improvement to a hardware circuit structure. Designers program improved method flows into hardware circuits to obtain corresponding hardware circuit structures. For example, a programmable logic device (PLD) (e.g., a field programmable gate array (FPGA)) is such an integrated circuit, of which the logic function is determined by a user through programming the device. Designers "integrate" a digital system onto a piece of PLD by independent programming without asking a chip manufacturer to design and manufacture a dedicated integrated circuit chip. Moreover, at present, instead of manually making an integrated circuit chip, this programming is also implemented mostly using "logic compiler" software, which is similar to a software compiler used for program development and compilation. However, the original code before compilation also has to be compiled using a specific programming language, which is known as a hardware description language (HDL). There is not only one, but many kinds of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). At present, VHDL (Very-High-Speed Integrated Circuit Hardware Description Language) and Verilog are the most commonly used. Those skilled in the art should also know that a hardware circuit for implementing a logic method flow can be easily obtained by slightly logically programming the method flow using the above several hardware description languages and programming it into an integrated circuit.

In some embodiments, a controller may be used to implement the above data processing methods. For example, the controller may be in the form of a microprocessor or processor and a computer-readable medium storing computer-readable program code (such as software or firmware) executable by this (micro)processor, a logic gate, a switch, an application specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A controller of a memory may also be implemented as part of the control logic of the memory. Those skilled in the art also know that, in addition to implementing a controller in the form of pure computer-readable program code, the method steps can be logically programmed to enable the controller to realize the same function in the form of logic gates, switches, special integrated circuits, programmable logic controllers, embedded microcontrollers, or the like.

The systems, apparatuses, modules, or devices in the above embodiments may be implemented by a computer chip or entity, or by a product with a certain function. An example implementation device is a computer. The computer may be, for example, a personal computer, a laptop computer, an on-board human-machine interaction device, a cellular phone, a camera phone, a smart phone, a personal digital assistant, a media player, a navigation device, an email device, a game console, a tablet computer, a wearable device, or a combination of any of these devices.

Although method operation steps are described in the embodiments or flowcharts, more or fewer operation steps may be included. The sequence of steps listed in the embodiments is only one example of many sequences of execution of the steps, which does not represent a unique sequence of execution. When the method is executed by an actual apparatus or device, the steps can be executed sequentially or in parallel according to the method shown in the embodiments or the drawings (for example, a parallel processor or multi-threaded processing environment, or even a distributed data processing environment).

For ease of description, the apparatus is described above to include various modules based on functions. The functions of the various modules can be implemented in one or more pieces of software and/or hardware, or the modules that realize the same function can be implemented by a combination of multiple submodules or subunits. The apparatus embodiments described above are only examples. For example, multiple modules may be combined or integrated into another system, or some features can be ignored or not implemented. In addition, the mutual coupling or direct coupling or communication connection may be indirect coupling or communication connection through some interfaces, apparatuses, or units, and may be in electrical, mechanical, or other forms.

The embodiments are described with reference to flowcharts and/or block diagrams. It should be understood that each flow and/or block in the flowcharts and/or block diagrams and a combination of flows and/or blocks in the flowcharts and/or block diagrams may be implemented by computer program instructions. These computer program instructions can be provided to a processor of a general-purpose computer, a special-purpose computer, an embedded processor, or another programmable resource data updating device to produce a machine, so that the instructions executed by the processor of the computer or another programmable resource data updating device produce an apparatus for realizing the functions specified in one or more flows of the flowcharts and/or one or more blocks of the block diagrams.

These computer program instructions may also be stored in a computer-readable medium that can direct a computer or another programmable resource data updating device to work in a specific manner, so that the instructions stored in this computer-readable medium produce an article of manufacture including an instruction apparatus which implements the functions specified in one or more flows of the flowcharts and/or one or more blocks of the block diagrams.

These computer program instructions can also be loaded onto a computer or another programmable resource data updating device, so that a series of operation steps are performed on the computer or another programmable device to produce computer-implemented processing, so that the instructions executed on the computer or another programmable device provide steps for implementing the functions specified in one or more flows of the flowcharts and/or one or more blocks of the block diagrams.

The computer-readable medium includes permanent and non-permanent, removable and non-removable media, which may implement storage of information by using any method or technology. The information may be a computer readable instruction, a data structure, a module of a program, or other data. Examples of a storage medium of a computer include, but are not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a read-only compact disc read-only memory (CD-ROM), a digital versatile disc (DVD) or other optical storage, a magnetic cassette tape, magnetic tape magnetic disk storage, graphene storage, or other magnetic storage devices, or any other non-transmission media, which may be configured to store information accessible to a computing device. As defined herein, the computer-readable medium does not include transitory computer-readable media (transitory media), such as a modulated data signal and a carrier.

One or more embodiments of the present specification may be implemented using computer-executable instructions executed by a computer, such as a program module. Generally, the program module includes a routine, a program, an object, an assembly, a data structure, and the like for executing a specific task or implementing a specific abstract data type. One or more embodiments of the present specification may also be practiced in distributed computing environments in which tasks are performed by remote devices connected through a communication network. In the distributed computing environments, the program module may be located in local and remote computer storage media including a storage device.

The above description is only example embodiments of the present specification and is not intended to limit the present specification. For those skilled in the art, various modifications and changes can be made to the described embodiments. Any modification, equivalent replacement, improvement, and the like made within the spirit and principle of the present specification shall be included in the scope of the claims.

The invention claimed is:

1. A data processing method, applied to an applet, the method comprising:
    sending a plug-in service request to a platform server, the plug-in service request comprising a plug-in identifier configured for the platform server to establish a usage association between a plug-in corresponding to the plug-in identifier and the applet, wherein the plug-in has an independent data server;
    receiving an applet access request, determining whether the applet access request and a service corresponding to the plug-in meet a preset correspondence, and if it is determined that the applet access request and the service corresponding to the plug-in meet the preset correspondence, loading the plug-in according to the usage association; and
    sending the applet access request to the plug-in, so that the plug-in completes a task corresponding to the applet access request by accessing the data server of the plug-in,
    wherein the plug-in comprises at least one of a component, a page, or a calling interface, and the loading the plug-in comprises at least one of:
    embedding the component in the plug-in into the applet, the component being provided with a component attribute configured to cause the applet to send the applet access request to the plug-in;
    adding a link to the page in the plug-in to the applet; or
    calling the calling interface in the plug-in;
    wherein in loading the plug-in by calling the calling interface in the plug-in, the method further comprises:
    sending a callback function to the plug-in through the calling interface, so that the plug-in accesses a data server of the applet when calling the callback function.

2. The method according to claim 1, further comprising:
    if it is determined that the applet access request and the service corresponding to the plug-in do not meet the preset correspondence, running the applet, and completing the task corresponding to the applet access request by accessing the data server of the applet.

3. The method according to claim 1, wherein the plug-in is loaded by calling the calling interface in the plug-in, and the method further comprises:
receiving an execution result of executing the applet access request returned by the plug-in through the calling interface.

4. The method according to claim 1, wherein the plug-in comprises a configuration declaration file comprising at least one of a component, a page, or a calling interface that are open to the applet, and the loading the plug-in according to the usage association comprises:
acquiring the configuration declaration file of the plug-in according to the usage association; and
loading the plug-in according to the configuration declaration file through the at least one of the component, the page, or the calling interface that are open to the applet by the plug-in.

5. A data processing device, comprising:
a processor; and
a memory storing instructions executable by the processor,
wherein the processor is configured to:
send a plug-in service request to a platform server, the plug-in service request comprising a plug-in identifier configured for the platform server to establish a usage association between a plug-in corresponding to the plug-in identifier and an applet, wherein the plug-in has an independent data server;
receive an applet access request, determine whether the applet access request and a service corresponding to the plug-in meet a preset correspondence, and if it is determined that the applet access request and the service corresponding to the plug-in meet the preset correspondence, load the plug-in according to the usage association; and
send the applet access request to the plug-in, so that the plug-in completes a task corresponding to the applet access request by accessing the data server of the plug-in,
wherein the plug-in comprises at least one of a component, a page, or a calling interface, and the processor is further configured to load the plug-in by using at least one of:
embedding the component in the plug-in into the applet, the component being provided with a component attribute configured to cause the applet to send the applet access request to the plug-in;
adding a link to the page in the plug-in to the applet; or
calling the calling interface in the plug-in,
wherein in loading the plug-in by calling the calling interface in the plug-in, the processor is further configured to:
send a callback function to the plug-in through the calling interface, so that the plug-in accesses a data server of the applet when calling the callback function.

6. The device according to claim 5, wherein the processor is further configured to:
if it is determined that the applet access request and the service corresponding to the plug-in do not meet the preset correspondence, run the applet, and complete the task corresponding to the applet access request by accessing the data server of the applet.

7. The device according to claim 6, wherein the processor loads the plug-in by calling the calling interface in the plug-in, and is further configured to:
receive an execution result of executing the applet access request returned by the plug-in through the calling interface.

8. The device according to claim 5, wherein the plug-in comprises a configuration declaration file comprising at least one of a component, a page, or a calling interface that are open to the applet, and the processor is further configured to:
acquire the configuration declaration file of the plug-in according to the usage association; and
load the plug-in according to the configuration declaration file through the at least one of the component, the page, or the calling interface that are open to the applet by the plug-in.

* * * * *